(No Model.)

S. GISSINGER.
RAILWAY CAR AXLE.

No. 391,703. Patented Oct. 23, 1888.

Witnesses:
H. E. Harrison.
J. A. Carline.

Inventor.
Samuel Gissinger,
Per O. D. Levis.
Att'y.

UNITED STATES PATENT OFFICE.

SAMUEL GISSINGER, OF PITTSBURG, ASSIGNOR OF ONE-HALF TO SAMUEL WAINWRIGHT, OF ALLEGHENY COUNTY, PENNSYLVANIA.

RAILWAY-CAR AXLE.

SPECIFICATION forming part of Letters Patent No. 391,703, dated October 23, 1888.

Application filed December 12, 1887. Serial No. 257,720. (No model.)

*To all whom it may concern:*

Be it known that I, SAMUEL GISSINGER, a citizen of the United States, residing at Pittsburg, in the county of Allegheny and State of Pennsylvania, have invented a certain new and useful Improvement in Railway-Car Axles; and I do hereby declare the following to be a full, clear, and exact description of the invention, such as will enable others skilled in the art to which it pertains to make and use the same, reference being had to the accompanying drawings, which form a part of this specification.

My invention relates to an improvement in that class of railway-car-wheel axles in which each of the wheels may revolve independent of the other, and thereby diminish the friction on the same when moving about a short curve.

The invention consists in the certain details of construction and combination of parts, as will be fully set forth hereinafter.

Figure 1:
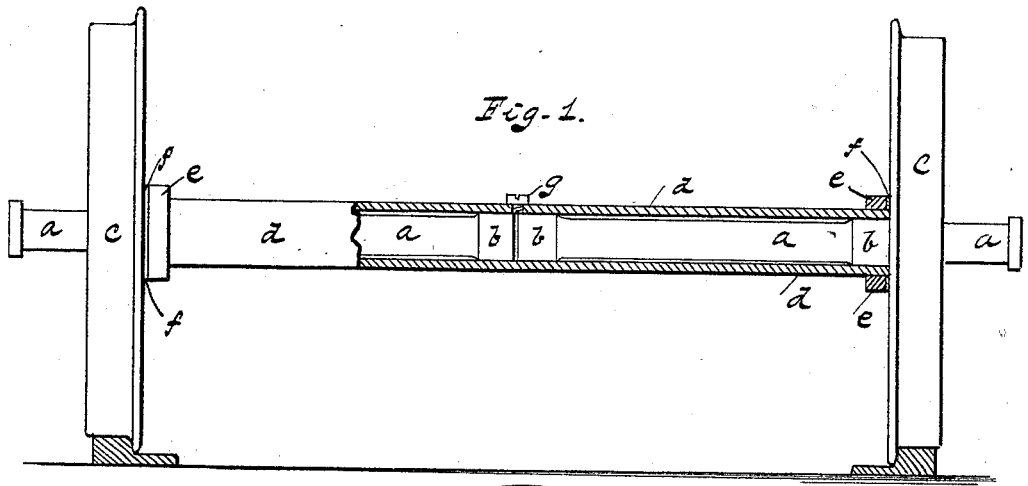
Figure 2:
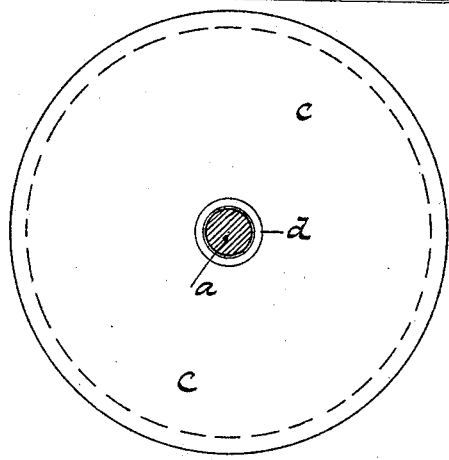

In the accompanying drawings, Figure 1 is a front elevation of an axle constructed in accordance with my invention, which is partly shown in section the better to show its working parts. Fig. 2 is a cross-sectional view of the same.

To put my invention into practice, I divide the axle $a$ at the center into two parts, each portion having an enlargement or bearing, $b$, at the end and close to the wheels $c$. I now provide a tube, $d$, the inside diameter of which is the same as that of the bearings $b$. On each end of this tube $d$ is securely attached a collar, $e$, which affords a substantial bearing against the hub of the wheels $c$. The two portions of the axle $a$ are now placed into the tube $d$ and two suitable washers, $f$, placed between the ends of the tube $d$ and the hub of the wheels $c$. A small opening provided with a tap-screw, $g$, serves as a means of introducing a lubricant.

With this construction each wheel $c$ may revolve independent of the other, thereby reducing the friction on the wheels when the same are traveling about a curve.

In a street-car the two portions of the axle $a$ are prevented from spreading laterally by the construction and arrangement of the boxes or bearings which support and are rigidly attached to the car, while in a railway-car the boxes or bearings are secured in a stout frame forming a part of the car-truck, which renders a lateral motion of the axle $a$ impossible.

Having thus described my invention, what I claim, and desire to secure by Letters Patent, is—

The combination and arrangement, substantially as shown and described, of the divided axle $a$, provided with the enlargements $b\,b$, the tube $d$, inclosing such axle and provided with the external collars, $e$, and washers $f$ and the wheels $c$, the longitudinal movement of the axle or the end-thrust of its halves being borne by the axle-boxes, and hence admitting of perfect freedom of movement of the axle-halves, as set forth.

SAMUEL GISSINGER.

Witnesses:
O. D. LEVIS,
C. C. LEE.